United States Patent [19]

Gay

[11] Patent Number: 5,001,701
[45] Date of Patent: Mar. 19, 1991

[54] SUBBAND ECHO CANCELER INCLUDING REAL TIME ALLOCATION AMONG THE SUBBANDS

[75] Inventor: Steven L. Gay, Lincroft, N.J.

[73] Assignee: AT&T Bell Laboratories, Murray Hill, N.J.

[21] Appl. No.: 390,320

[22] Filed: Aug. 7, 1989

[51] Int. Cl.$^5$ .............................................. H04B 3/20
[52] U.S. Cl. ................................... 370/32.1; 379/406; 379/410
[58] Field of Search ................ 370/32, 32.1; 379/406, 379/410, 411

[56] References Cited

U.S. PATENT DOCUMENTS

| | | | |
|---|---|---|---|
| 4,349,889 | 9/1982 | Van den Elzen et al. | 370/32.1 |
| 4,554,417 | 11/1985 | Boyer | 370/32.1 |
| 4,574,166 | 3/1986 | Grifton | 370/32.1 |

FOREIGN PATENT DOCUMENTS

| | | | |
|---|---|---|---|
| 0122341 | 6/1987 | Japan | 379/410 |
| 0294017 | 11/1988 | Japan | 379/406 |

OTHER PUBLICATIONS

D. L. Duttweiler et al., "A Single-Chip VLSI Echo Canceler", *The Bell System Technical Journal*, vol. 59, No. 2, Feb. 1980, pp. 149–160.

J. F. Doherty et al., "A New Fast Method For Channel Estimation", IEEE International Conference on Communications, Conference Record, vol. 2, Jun. 11–14, 1989, pp. 815–819.

"Row Action Methods For Huge and Sparse Systems and Their Applications", *Sian Review*, vol. 23, No. 4, Oct. 1981, pp. 444–466.

A. Gilloire, "Experiments With Sub-Band Acoustic Echo Cancellers for Teleconferencing", 1987 *International Conference on Acoustics, Speech and Signal Processing*, vol. 4, pp. 2141–2144.

W. Kellermann, "Analysis and Design of Multirate Systems For Cancellation of Acoustical Echoes", 1988 *International Conference On Acoustics, Speech and Signal Processing*, vol. 5, pp. 2570–2573.

Primary Examiner—James L. Dwyer
Assistant Examiner—M. Shehata
Attorney, Agent, or Firm—Thomas Stafford

[57] ABSTRACT

A subband echo canceler is disclosed in which blocks of real time are dynamically allocated to a plurality of generalized adaptive filters associated with a plurality of subbands in order to realize faster overall convergence to a desired impulse response. In one example, the real time block allocation is based on the weighted norm of the difference between the generalized adaptive filter coefficients from one sample period and an at least next subsequent sample period.

17 Claims, 4 Drawing Sheets

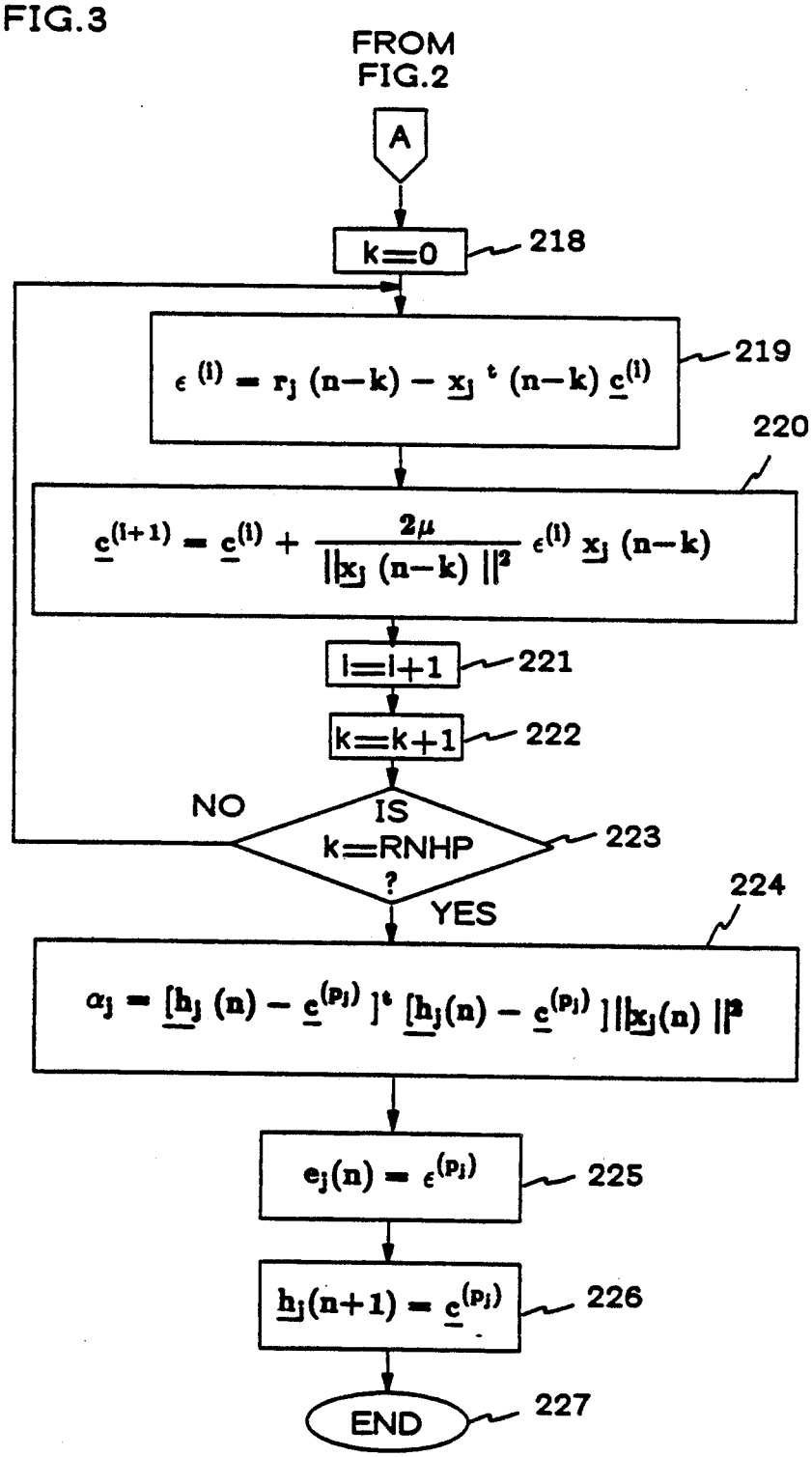

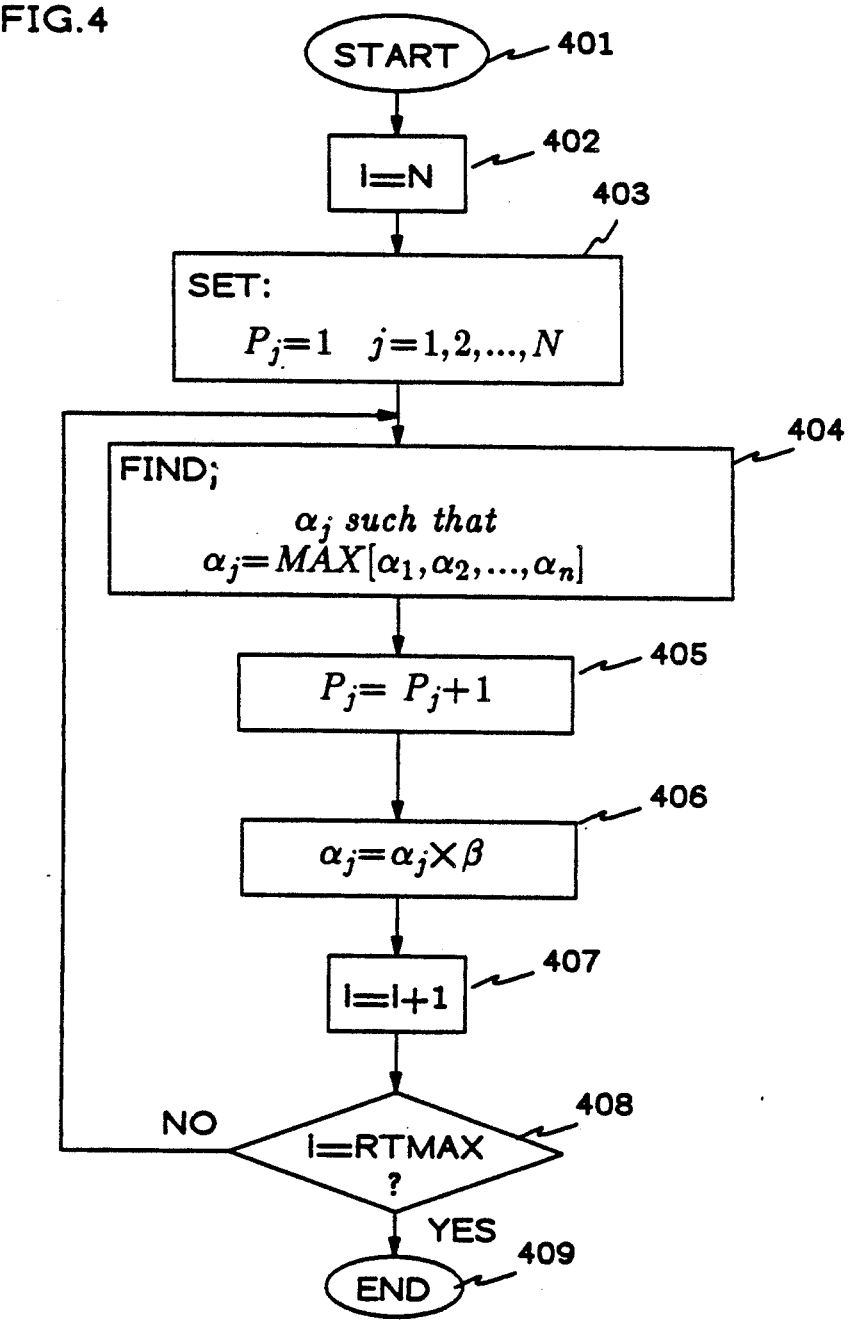

SUBBAND ECHO CANCELER INCLUDING REAL TIME ALLOCATION AMONG THE SUBBANDS

TECHNICAL FIELD

This invention relates to echo canceling and, more particularly, to echo cancelers having long impulse responses.

BACKGROUND OF THE INVENTION

In prior known subband echo cancelers techniques have been employed in attempts at canceling echos with long impulse responses. A problem with such prior echo cancelers is that they still required a long time to converge to the impulse response of the echo path. Therefore, in certain applications, for example, in canceling echos due to acoustical coupling, the prior subband echo cancelers typically failed to converge to the correct impulse response with sufficient speed.

SUMMARY OF THE INVENTION

These and other problems and limitations of prior echo cancelers are overcome, in accordance with an aspect of the invention, by dynamically allocating real-time among a plurality of generalized adaptive filters associated with a plurality of subbands in a subband echo canceler to achieve faster overall convergence.

More specifically, real-time is dynamically allocated among the generalized adaptive filters in accordance with prescribed criteria based on the degree of the misalignment of the generalized adaptive filters and/or the amount of the excitation energies associated with the individual subbands.

In an exemplary embodiment of the invention, the real time allocation is achieved by utilizing a weighted norm for each of the generalized adaptive filters which is the difference from an associated generalized adaptive filter coefficient from a current sample period and an associated generalized adaptive filter coefficient from an at least next subsequent sample period.

BRIEF DESCRIPTION OF THE DRAWING

In the Drawing:

FIGS. 2 and 3 when connected A—A form a flow chart illustrating the operation of the generalized adaptive filters (GAFs) employed in the echo canceler of FIG. 1; and FIG. 4 is a flow chart of the real time allocator (RTA) employed in the embodiment shown in FIG. 1.

DETAILED DESCRIPTION

Figure 1:
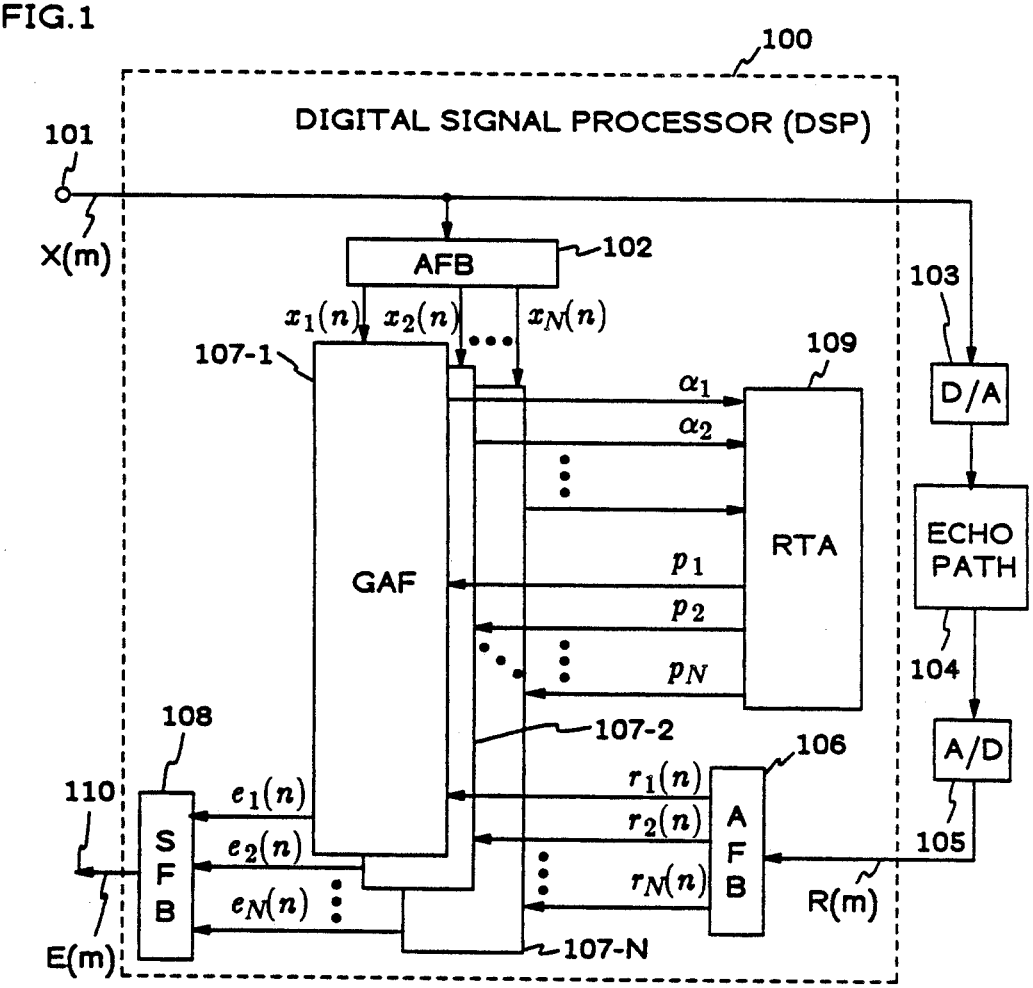
FIG. 1 shows, in simplified block diagram form, a subband echo canceler including an embodiment of the invention.
Figure 2:
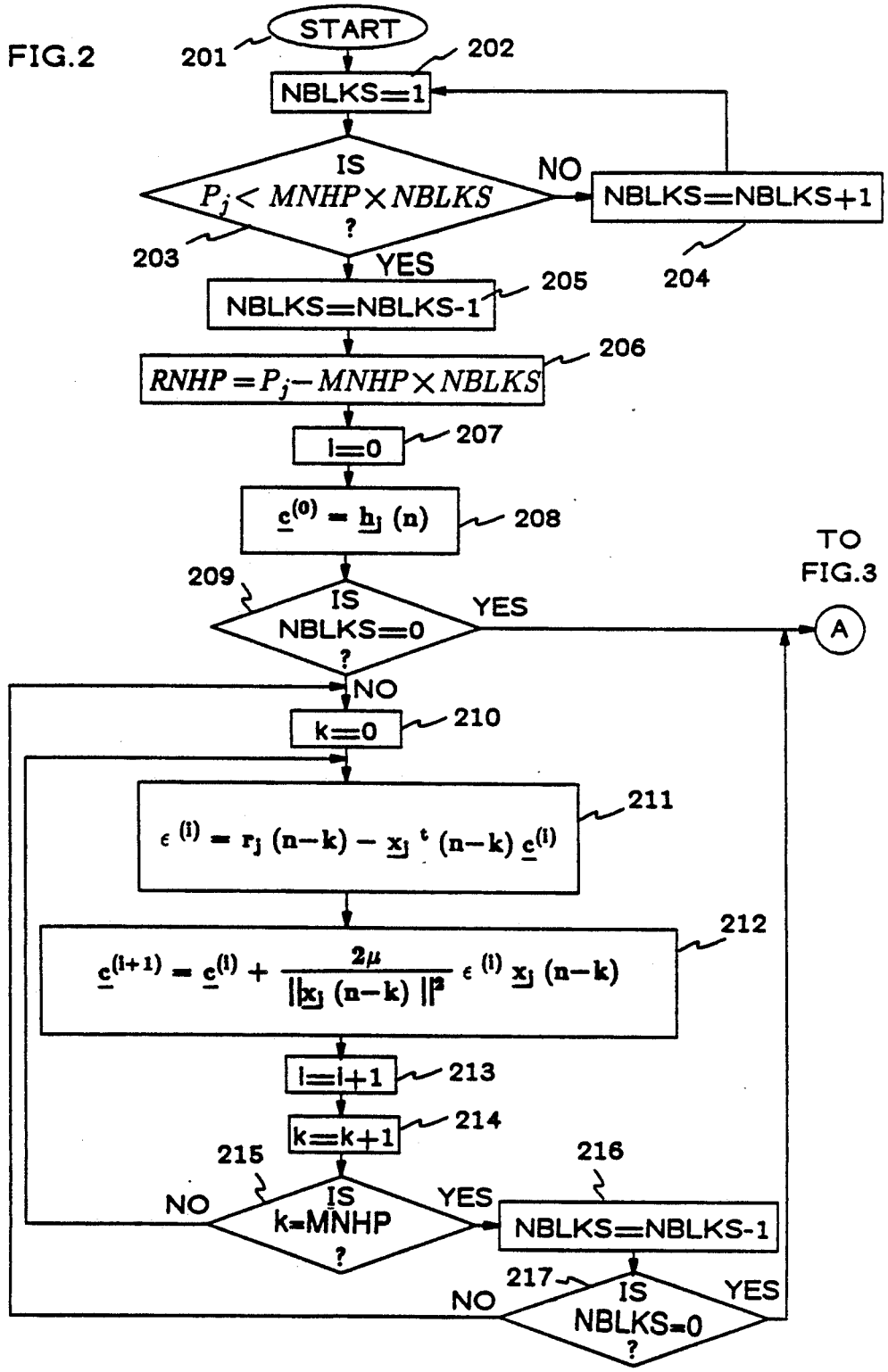

FIG. 1 shows, in simplified block diagram form, echo canceler 100 including an aspect of the invention. Echo canceler 100 receives a incoming far-end signal $X(m)$ which is supplied to analysis subband filter bank (AFB) 102 and, then, via digital-to-analog (D/A) conventer 103 to interface to echo path 104. It will be apparent to those skilled in the art that such interfaces also include digital line interface apparatus of a type known in the art. It is noted that in this example the sampling rate of the subband signals is lower by a factor of N than the sampling rate of the incoming signals. In this example, echo path 104 can be either a long electrical path or an acoustical path. AFB 102 separates the signal $X(m)$ into a plurality of subband signals $x_1(n), x_2(n), \ldots, x_N(n)$ in well known fashion. Response signal $R(m)$, i.e., the incoming near-end signal, is supplied from echo path 104 via analog-to-digital (A/D) converter 105 to AFB 106. In turn, AFB 106 separates the response signal $R(m)$ into a plurality of subband response signals $r_1(n), r_2(n), \ldots, r_N(n)$. Subband signals $x_1(n), x_2(n), \ldots, x_N(n)$ are supplied to the secondary inputs of generalized adaptive filters (GAFs) 107-1 through 107-N, respectively. Subband response signals $r_1'(n), r_2(n), \ldots, r_N(n)$ are supplied to the primary inputs of generalized adaptive filters 107-1 through 107-N, respectively. Generalized adaptive filters 107-1 through 107-N generate subband error signals $e_1(n), e_2(n), \ldots, e_N(n)$, respectively, which are assembled by the subband synthesis filter bank (SFB) 108 to form error signal $E(m)$. Error signal $E(m)$ is supplied as an output at terminal 110 of echo canceler 100. Parameters $a_1$ through $a_N$ are obtained from generalized adaptive filters 107-1 through 107-N, respectively, and are supplied to real time allocator 109. Parameters $a_1$ through $a_N$ are so-called measures of subband misalignment which are representative, in accordance with an aspect of the invention, of the weighted norm of the difference between the generalized adaptive filter coefficients from a current sample period and an at least next subsequent sample period. However, it will be apparent to those skilled in the art from the following description that filter coefficients from prior sample periods may also be advantageously employed for this purpose. Real time allocator 109 is responsive to parameters $a_1$ through $a_N$ to allocate the available real time among the generalized adaptive filters 107-1 through 107-N, i.e., among the subbands. This real time allocation is represented, in this embodiment of the invention, by $p_1$ through $p_N$ which are the number of so-called real time blocks (RTBs) allocated to the subbands, i.e., the number of convolutions and coefficient updates of generalized adaptive filters 107-1 to 107-N, respectively. To this end, signals $p_1$ through $p_N$ are supplied from real time allocator 109 to generalized adaptive filters 107-1 through 107-N, respectively. Generalized adaptive filters 107 are, for example, generalized adaptive transversal filters.

Echo canceler 100 is shown in FIG. 1 in block diagram form to facilitate clarity of description. However, in a preferred embodiment of the invention echo canceler 100 is implemented by programming a digital signal processor (DSP). Any one of a number of DSPs known in the art may be used for this purpose. One such DSP is commercially available from American Telephone and Telegraph Company and is described in "WE DSP16 and DSP16A Digital Signal Processor Information Manual", Nov. 1988, AT&T Technologies.

The filter functions of AFB 102, AFB 106, and SFB 108 are readily realized by programming a DSP in a manner well known in the art and, therefore, will not be described here.

The theory of operation of generalized adaptive filters 107-1 through 107-N, in accordance with an aspect of the invention, follows to assist in better understanding the invention. To this end, the following notation will be used herein. The vector $\underline{x}_j(n)$ will represent the state variables of the one of generalized adaptive filters 107 of subband j at sample period n where $j = 1, \ldots, N$:

$$\underline{x}_j(n) = [x_j(n), x_j(n-1), \ldots, x_j(n-M+1)] \qquad (1)$$

where the t superscript denotes transpose. Similarly, the coefficients of subband j at sample period n are represented by the vector $$\underline{h}_j{}^t(n) = [h_j(n,0), h_j(n,1), \ldots, h_j(n,M-1)] \tag{2}$$

With this notation an output of the convolution of the signal $x_j(n)$ with the filter $h_j(n)$ at sample period n is denoted by the vector multiplication:

$$\hat{r}_j(n) = \underline{x}_j{}^t(n)\underline{h}_j(n) \tag{3}$$

A standard echo canceler uses a standard adaptive filter to cancel the echo (see for example an article by D. L. Duttweiler et al. entitled "A Single-Chip VLSI Echo Canceler", *The Bell System Technical Journal*, Vol. 59, No. 2, February, 1980, pages 149-160). In the prior echo canceler arrangement the primary signal is $r_j(n)$ and the secondary signal is $x_j(n)$. The adaptive filter attempts to generate a replica of $r_j(n)$ from $x_j(n)$. It does this by first convolving $x_j(n)$ with the filter coefficients $h_j(n)$, namely $$\hat{r}_j(n) = \underline{x}_j{}^t(n)\underline{h}_j(n) \tag{4}$$

This $\hat{r}_j(n)$ represents the filter's estimate of $r_j(n)$. The error signal $e_j(n)$ is then found by $$e_j(n) = r_j(n) - \hat{r}_j(n). \tag{5}$$

The error signal $e_j(n)$ is also used to adjust the filter coefficients $\underline{h}_j(n)$. This is realized by using the standard least means square (LMS) update:

$$\underline{h}(n+1) = \underline{h}(n) + 2\frac{\mu}{\|\underline{x}_j(n)\|^2} e(n)\underline{x}_j(n), \tag{6}$$

where $\mu$ is known as the step size parameter and $\|\underline{x}_j(n)\|^2$ is $\underline{x}_j{}^t(n)\underline{x}_j(n)$, i.e., the norm of the state variables of generalized adaptive filter 107-j.

The amount of time that a DSP requires to perform the functions of convolution equations (4) and (5) and the coefficient update of equation (6) is referred to as a real time block (RTB).

Equations (1) through (3) for $\mu = \frac{1}{2}$ find the next M dimensional coefficient vector $\underline{h}_j(n+1)$ by orthogonally projecting the current vector $\underline{h}_j(n)$ onto an M dimensional hyperplane, $HP_n$, defined by the vector $\underline{x}_j(n)$ and the sample $r_j(n)$. When $\mu < \frac{1}{2}$ a so-called "relaxed" projection is made and $\underline{h}_j(n+1)$ lies on the line segment between the points defined by $\underline{h}_j(n)$ and its orthogonal projection onto $HP_n$ (see for example, an article entitled "A New Fast Method For Channel Estimation," *IEEE International Conference On Communications*, Conference Record, VOL.2, June 11-14, 1989, pages 815-819 and an article entitled "Row-Action Methods For Huge and Sparse Systems and Their Applications," *Sian Review*, VOL. 23, No. 4, October, 1981, pages 444-466).

In standard echo cancelers one such projection is made during each sample period. In other sample periods new hyperplanes are defined by new vectors $\underline{x}_j(n)$ and samples $r_j(n)$. The coefficient vector $\underline{h}_j(n)$ will eventually converge to the intersection of all of these hyperplanes. If, in a given sample period, there is sufficient time to perform more than one such projection, convergence can be accelerated, in accordance with an aspect of the invention (in the sense that fewer sample periods will be required for $\underline{h}_j(n)$ to reach the point of interseciton). For example, if in sample period n there is sufficient time to perform five projections, then those five projections could be made on the hyperplanes defined by the present and past four $\underline{x}_j(n)$s and $r_j(n)$s.

For practical reasons a maximum number of hyperplanes is defined as MNHP. If more real time is available than can be used for the projections onto these MNHP hyperplanes, then it is possible to cycle through these MNHP hyperplanes for as long as there is time available.

Accordingly, the operation of one of generalized adaptive filters 107-1 through 107-N associated with subband j, in accordance with an aspect of the invention, is described in conjuction with the flow chart formed when connecting FIG.s 2 and 3 via A—A as shown. Thus, the operation of generalized adaptive filter 107-j is begun via start step 201.

The purpose of operational blocks 202, 204, 205, and conditional branch point 203 is to find NBLKS. NBLKS is defined as the number of times that all of the MNHP hyperplanes can be projected onto within the $p_j$ allocated real time blocks. Operational block 206 then finds RNHP, i.e., the number of residual hyperplane projections that can be made. Following operational block 206, the relation $$p_j = MNHP \times NBLKS + RNHP \tag{7}$$

is true.

More specifically, operational block 202 sets the parameter NBLKS to one. Conditional branch point 203 sets compares MNHP × NBLKS with $p_j$. If the product is not greater than $p_j$ then control proceeds to operational block 204 which increments NBLKS by one. If, however, in conditional branch point 203, the product is greater than $p_j$, control proceeds to operational block 205 which decrements NBLKS by one. Operational block 206 sets RNHP to $p_j$—MNHP × NBLKS. Operational block 207 sets index i to zero. Operational block 208 sets $\underline{c}^{(0)}$ to $\underline{h}_j(n)$. Where $\underline{c}^{(i)}$ denotes the $i^{th}$ projection of the filter coefficient vector. In the last operational block in the operation of the generalized adaptive filter 107-j (operational block 226) the final coefficient vector $\underline{h}_j(n+1)$ is set to the final projection, $\underline{c}^{(p_j)}$. Conditional branch point block 209 compares NBLKS to zero. If NBLKS is zero, then control proceeds to operational block 218. Otherwise, control proceeds to operational block 210 and index k is set to zero. Operational blocks 211 and 212 perform a relaxed projection of the $i^{th}$ coefficient vector, $\underline{c}^{(i)}$ onto the hyperplane defined by the state vector $\underline{x}_j(n-k)$ and the scalar $r_j(n-k)$ to obtain the $(i+1)^{th}$ coefficient vector projection, $\underline{c}^{(i+1)}$. This projection is realized by $$\epsilon^{(i)} = r_j(n-k) - \underline{x}_j(n-k)^t \underline{c}^{(i)} \tag{8}$$

and $$\underline{c}^{(i+1)} = \underline{c}^{(i)} + \frac{2\mu}{\|\underline{x}_j(n-k)\|^2} \epsilon^{(i)} \underline{x}_j(n-k). \tag{9}$$

Operational blocks 213 and 214 increment the indices i and k by one, respectively. Conditional branch point 215 compares k to MNHP. If k and MNHP are not equal, control returns to operational block 211. If, however, in conditional branch point 215, k and MNHP are equal, control proceeds to operational block 216. Operational block 216 decrements NBLKS by one. Conditional branch point 217 compares NBLKS to zero. If NBLKS is not zero, control returns to operational block 210. If, however, in conditional branch point 217, NBLKS is zero, control proceeds to operational block 218. Operation block 218 sets the index k to zero. Operation blocks 219 and 220 perform a relaxed projection of the $i^{th}$ coefficient vector, $\underline{c}^{(i)}$ onto the hyperplane defined by the state vector $\underline{x}_j(n-k)$ and the scalar $r_j(n-k)$ to obtain the $(i+1)^{th}$ coefficient vector projection, $\underline{c}^{(i+1)}$. This projection is realized by $$\epsilon^{(i)} = r_j(n-k) - \underline{x}_j(n-k)^t \underline{c}^{(i)} \quad (10)$$

and $$\underline{c}^{(i+1)} = \underline{c}^{(i)} + \frac{2\mu}{\|\underline{x}_j(n-k)\|^2} \epsilon^{(i)} \underline{x}_j(n-k). \quad (11)$$

Operational blocks 221 and 222 increment the indices i and k by one, respectively. Conditional branch point 223 compares k to RNHP. If k and RNHP are not equal, control returns to operational block 219. If, however, in conditional branch point 223 k, and RNHP are equal, control proceeds to operational block 224. Operational block 224 calculates the misalignment measure for this $j^{th}$ subband, namely, $\alpha_j$. The parameter $\alpha_j$ is the weighted norm of the difference of the present sample's coefficient vector, $\underline{h}_j(n)$ and the next sample's coefficient vector, $\underline{c}^{(pj)}$, namely $$\alpha_j = [\underline{h}_j(n) - \underline{c}^{(pj)}]^t [\underline{h}_j(n) - \underline{c}^{(pj)}] \|\underline{x}_j(n)\|^2 \quad (12)$$

If there is little or no excitation energy in a given subband there will be no echo in that subband and, consequently, the misalignment of the associated adaptive filter is not of any significance. For this reason, the so-called generalized adaptive filter misalignment is weighted by a representation of the excitation energy in the subband, namely, $\|\underline{x}_j(n)\|^2$. It will be apparent to those skilled in the art that in some applications the weighting by the excitation energy may not be needed.

Operational block 225 sets the error signal $e_j$ for subband j equal to $\epsilon^{(pj)}$. Operational block 226 sets the next sample's coefficient vector, $\underline{h}_j(n+1)$ to $\underline{c}^{(pj)}$. Operation block 227 terminates the operation of generalized adaptive filter 107-j.

FIG. 4 is a flow chart illustrating operation of real time allocator 109, in accordance with an aspect of the invention. Accordingly, the operation of real time allocator 109 is begun by a start step 401. Then, operational block 402 initializes index i to be N. Index i is used to track the number of real time blocks which have been allocated. Operational block 403 sets the subband parameters $p_j$ to be one for $j = 1, 2, \ldots, N$. Operational blocks 402 and 403 effect the allocation of one real time block per subband. Operational block 404 finds the maximum $\alpha_j$ for $j = 1, 2, \ldots, N$. This operation determines the subband index j which will have a convolution-coefficient-update allocated to it. Operational block 405 increments by one the subband parameter $p_j$, where index j is that subband found in operational block 404. Operational block 406 replaces $\alpha_j$ with $\alpha_j\beta$. The value of $\beta$ is predetermined and in one example $\beta = \frac{1}{4}$.

In summary, operational blocks 404 through 406 serve the purpose of allocating a block of real time sufficient for one of generalized adaptive filters 107-1 through 107-N, namely, 107-j to perform a single convolution-and-coefficient-update. Each real time block allocated to a subband will on average lower the misalignment of the particular one of generalized adaptive filters 107-1 through 107-N associated with that subband in the next sample period. For this reason the misalignment measures are decreased each time a real time block is allocated to a subband.

In operational block 407 index i is incremented by one. In conditional branch point 408 index i is tested to see if it is equal to the value RTMAX. RTMAX is a parameter which represents the maximum number of real time blocks that can be performed in real time. If index i is not yet equal to RTMAX, then operational block 404 is executed next. When index i is equal to RTMAX, operation of real time allocator 109 is terminated at end step 409.

I claim:

1. An echo canceler including
   first means for dividing a primary incoming signal into a plurality of first subband signals,
   second means for dividing a secondary incoming signal into a plurality of second subband signals,
   a plurality of adaptive filters, each of said adaptive filters being responsive to associated ones of said first and second subband signals for generating a corresponding error signal,
   said echo canceler being,
   characterized by,
   each of said plurality of adaptive filters being responsive to its corresponding error signal and its associated first and second subband signals for generating a misalignment signal, and
   means responsive to said misalignment signals from said plurality of adaptive filters for dynamically allocating blocks of real time among said plurality of adaptive filters.

2. An echo canceler as defined in claim 1 wherein said means for allocating includes means for assigning blocks of real time to individual ones of said plurality of adaptive filters based on a degree of misalignment of said adaptive filters.

3. An echo canceler as defined in claim as defined in claim 2 further including means for interfacing said echo canceler to a path including an echo path.

4. An echo canceler as defined in claim 1 wherein said means for allocating includes means for detecting which of said misalignment signals has the largest value and means for assigning a block of said real time blocks to an adaptive filter which generated said detected misalignment signal.

5. An echo canceler as defined in claim 4 wherein said means for generating said misalignment signal includes means for obtaining a measure of a norm of a difference from an associated adaptive filter coefficient for a current sample period and an associated adaptive filter coefficient from an at least next subsequent sample period.

6. An echo canceler as defined in claim 5 wherein said means for generating said misalignment signal further includes means for weighting said norm by a representation of excitation energy in said corresponding subband.

7. An echo canceler as defined in claim 5 wherein said means for generating said misalignment signal further includes means for weighting said norm by a representation of state variables for said associated adaptive filter for said current sample period.

8. An echo canceler as defined in claim 6 wherein said means for generating said misalignment signal includes means for generating said misalignment signal in accordance with $$a_j = [h_j(n) - c^{(pj)}]^T [h_j(n) - c^{(pj)}] \| x_j(n) \|^2,$$

where $a_j$ is said misalignment signal, $j = 1, 2, \ldots, N$ adaptive filters, $h_j(n)$ is a filter coefficient vector for a current sample period, $c^{(pj)}$ is a filter coefficient vector for a next subsequent sample period, $x_j(n)$ is a state variable of the adaptive filter for the current sample period and t denotes the transpose of a vector.

9. A method of canceling echos including the steps of,
dividing a primary incoming signal into a plurality of first subband signals,
dividing a secondary incoming signal into a plurality of second subband signals,
generating a plurality of error signals by employing a plurality of adaptive filters, each of said adaptive filters being responsive to associated ones of said first and second subband signals for generating a corresponding error signal,
said method being,
Characterized by
each of said plurality of adaptive filters being responsive to its corresponding error signal and its associated first and second subband signals for generating a misalignment signal, and
dynamically allocating blocks of real time among said plurality of adaptive filters in response to said misalignment signals from said plurality of adaptive filters.

10. A method for canceling echos as defined in claim 9 wherein said step of allocating includes a step of assigning said blocks of real time to individual ones of said plurality of adaptive filters based on a degree of misalignment of said adaptive filters.

11. A method for canceling echos as defined in claim 10 further including a step of interfacing to a path including an echo path.

12. A method for canceling echos as defined in claim 9 wherein said step of allocating includes a step of detecting which of said misalignment signals has the largest value and a step of assigning a block of said real time blocks to an adaptive filter which generated said detected misalignment signal.

13. A method for canceling echos as defined in claim 12 wherein said step of generating said misalignment signal includes a step of obtaining a measure of a norm of a difference from an associated adaptive filter coefficient from a current sample period and an associated adaptive filter coefficient from an at least next subsequent sample period.

14. A method for canceling echos as defined in claim 13 wherein said step of generating said misalignment signal further includes a step of weighting said norm by a representation of excitation energy in said corresponding subband.

15. A method for canceling echos as defined in claim 14 wherein said step of generating said misalignment signal includes generating said misalignment signal in accordance with $$a_j = [h_j(n) - c^{(pj)}]^T [h_j(n) - c^{(pj)}] \| x_j(n) \|^2,$$

where $a_j$ is said misalignment signal, $j = 1, 2, \ldots, N$ adaptive filters, $h_j(n)$ is a filter coefficient vector for a current sample period, $c^{(pj)}$ a filter coefficient vector for a next subsequent sample period, $x_j(n)$ is a state variable of the adaptive filter for the current sample period and t denotes the transpose of a vector.

16. An echo canceler including
first means for dividing a primary incoming signal into a plurality of first subband signals,
second means for dividing a secondary incoming signal into a plurality of second subband signals,
a plurality of adaptive filters, each of said adaptive filters being responsive to associated ones of said first and second subband signals for generating a corresponding error signal,
said echo canceler being,
characterized by
means for dynamically allocating blocks of real time among said plurality of adaptive filters.

17. A method of canceling echos including the steps of,
dividing a primary incoming signal into a plurality of first subband signals,
dividing a secondary incoming signal into a plurality of second subband signals,
generating a plurality of error signals by employing a plurality of adaptive filters, each of said adaptive filters being responsive to associated ones of said first and second subband signals for generating a corresponding error signal,
said method being,
characterized by
dynamically allocating blocks of real time amount said plurality of adaptive filters.

* * * * *